(12) United States Patent
Kim et al.

(10) Patent No.: US 11,021,058 B1
(45) Date of Patent: Jun. 1, 2021

(54) FOLDABLE ACCELERATOR PEDAL APPARATUS EQUIPPED WITH HYSTERESIS MODULE FOR VEHICLE

(71) Applicants: Hyundai Motor Company, Seoul (KR); Kia Motors Corporation, Seoul (KR); Kyung Chang Industrial Co., Ltd., Daegu (KR)

(72) Inventors: Eun Sik Kim, Gyeonggi-do (KR); Hyeon Uk Kim, Daegu (KR); Sung Il Byun, Daegu (KR)

(73) Assignees: Hyundai Motor Company, Seoul (KR); Kia Motors Corporation, Seoul (KR); Kyung Chang Industrial Co., Ltd., Daegu (KR)

( * ) Notice: Subject to any disclaimer, the term of this patent is extended or adjusted under 35 U.S.C. 154(b) by 0 days.

(21) Appl. No.: 17/014,567

(22) Filed: Sep. 8, 2020

(30) Foreign Application Priority Data

Jun. 2, 2020 (KR) .................. 10-2020-0066681

(51) Int. Cl.
*G05G 1/40* (2008.04)
*B60K 26/02* (2006.01)
(Continued)

(52) U.S. Cl.
CPC .............. *B60K 26/02* (2013.01); *B60R 21/09* (2013.01); *G05G 1/38* (2013.01); *G05G 1/40* (2013.01); *G05G 5/005* (2013.01); *G05G 5/03* (2013.01); *G05G 5/28* (2013.01); *B60K 2026/025* (2013.01); *B60K 2026/026* (2013.01); *B60T 7/06* (2013.01); *B60T 7/065* (2013.01); *G05G 1/30* (2013.01); *G05G 1/44* (2013.01); *G05G 5/05* (2013.01)

(58) Field of Classification Search
CPC . B60R 21/09; G05G 1/30; G05G 1/32; G05G 1/38; G05G 1/40; G05G 1/405; G05G 1/44; G05G 1/445; G05G 5/005; G05G 5/28; G05G 5/03; G05G 5/05; B60K 2026/026; B60K 26/021; B60K 26/02; B60T 7/065; B60T 7/06; B60T 7/04
See application file for complete search history.

(56) References Cited

U.S. PATENT DOCUMENTS 6,182,525 B1 * 2/2001 Bowers ................. B60K 20/02 180/274
6,364,047 B1 * 4/2002 Bortolon ................ B60K 23/02 180/334

(Continued)

FOREIGN PATENT DOCUMENTS

FR 2981889 A1 5/2013
KR 2017-0137427 A 12/2017

*Primary Examiner* — Richard W Ridley
*Assistant Examiner* — Brian J McGovern
(74) *Attorney, Agent, or Firm* — Mintz Levin Cohn Ferris Glovsky and Popeo, P.C.; Peter F. Corless

(57) ABSTRACT

A foldable accelerator pedal apparatus is equipped with a hysteresis module for a vehicle. In a manual driving mode where a driver drives a vehicle with human input, a pedal pad protrudes from a pedal housing to be exposed toward the driver. In an autonomous traveling mode where the vehicle travels without any human input, the pedal pad retracts into the pedal housing so as not to be exposed toward the driver. When operating the pedal pad, hysteresis may be realized through the hysteresis module.

17 Claims, 14 Drawing Sheets

(51) Int. Cl.
  *G05G 1/38* (2008.04)
  *B60R 21/09* (2006.01)
  *G05G 5/28* (2006.01)
  *G05G 5/03* (2008.04)
  *G05G 5/00* (2006.01)
  G05G 1/30 (2008.04)
  G05G 1/44 (2008.04)
  G05G 5/05 (2006.01)
  B60T 7/06 (2006.01)

(56) References Cited

U.S. PATENT DOCUMENTS

| | | | |
|---|---|---|---|
| 9,283,934 B2 | 3/2016 | Shand | |
| 10,739,011 B2 | 8/2020 | Cowan et al. | |
| 2004/0259687 A1* | 12/2004 | Ritter | B60T 7/042 |
| | | | 477/187 |
| 2008/0147287 A1* | 6/2008 | Park | G05G 5/03 |
| | | | 701/70 |
| 2009/0223319 A1 | 9/2009 | Choi | |
| 2010/0139445 A1* | 6/2010 | Kim | G05G 1/38 |
| | | | 74/514 |
| 2011/0132134 A1* | 6/2011 | Kim | G05G 1/30 |
| | | | 74/514 |
| 2013/0125682 A1* | 5/2013 | Kim | G05G 5/03 |
| | | | 74/89.23 |
| 2014/0311278 A1* | 10/2014 | Min | B60K 26/021 |
| | | | 74/513 |
| 2014/0316648 A1 | 10/2014 | Min | |
| 2014/0373667 A1* | 12/2014 | Kim | G05G 1/40 |
| | | | 74/513 |
| 2015/0107402 A1* | 4/2015 | Leem | G05G 1/40 |
| | | | 74/512 |

* cited by examiner

FOLDABLE ACCELERATOR PEDAL APPARATUS EQUIPPED WITH HYSTERESIS MODULE FOR VEHICLE

CROSS REFERENCE TO RELATED APPLICATION

The present application claims under 35 U.S.C. § 119(a) the benefit of Korean Patent Application No. 10-2020-0066681, filed Jun. 2, 2020, the entire contents of which are incorporated by reference herein.

BACKGROUND

(a) Technical Field

The present disclosure relates to a foldable accelerator pedal apparatus equipped with a hysteresis module for a vehicle, more particularly, to the foldable accelerator pedal that is configured such that a pedal pad protrudes from a pedal housing so as to be exposed toward a driver and operable by the driver in a manual driving mode, where the pedal pad retracts into the pedal housing so as to be concealed and not operable by the driver in an autonomous traveling mode.

(b) Description of the Related Art

Autonomous vehicles are smart vehicles employing an autonomous traveling technology that enables a vehicle to travel to a destination without a driver directly operating a steering wheel, an accelerator pedal, a brake, and the like. In recent years, rapid development has progressed on these vehicles.

In a case where autonomous travel is available, the driver can make a selection between a manual driving mode where the vehicle drives with human input and an autonomous traveling mode where the vehicle drives without human input.

For example, in the autonomous traveling mode, the driver does not operate the accelerator pedal or the brake pedal of the vehicle. If the driver attempts to operate either of these pedals during autonomous traveling, a vehicle control unit determines that the driver desires to end autonomous traveling and to manually drive the vehicle, and ends control for autonomous traveling.

In the autonomous traveling mode, it is required that the driver is able to rest comfortably, e.g., by stretching out his/her legs. However, when pedals (an accelerator pedal and a brake pedal) that are positioned in a space below a driver's seat remain exposed toward the driver, it may become difficult or impossible for the driver to experience rest.

Because the pedals of the vehicle are installed to be exposed in the space below the driver's seat, there is a concern that the driver will unintentionally (i.e., mistakenly) operate the pedals in the autonomous traveling mode. In this case, there is concern that an accident will occur depending on a road condition or a distance between traveling vehicles.

Therefore, there is a need to develop an arrangement of a pedal apparatus in which, in the manual driving mode, the pedal pad protrudes in a manner that is exposed toward the driver and is operable by the driver, and in the autonomous traveling mode, the pedal pad retracts in a manner that is prevented from being exposed and is not operable by the driver to enable the driver to rest comfortably while ensuring the safety of the driver, thus preventing improper functioning of the pedal apparatus.

The foregoing is intended merely to aid in understanding the background of the present disclosure and therefore should not be interpreted to admit that the present disclosure falls within the purview of the related art that is already known to a person of ordinary skill in the art.

SUMMARY

A foldable accelerator pedal apparatus for a vehicle includes a pedal pad equipped with a hysteresis module that realizes a hysteresis effect and which is configured such that in a manual driving mode, the pedal pad protrudes from a pedal housing in a manner that is exposed toward the driver and is operable by the driver, and in an autonomous traveling mode, the pedal pad retracts into the pedal housing in a manner that is concealed and is not operable by the driver. The pedal apparatus provides advantages that the driver can rest comfortably in the autonomous traveling mode and that improper functioning of the pedal is prevented for improving the safety of the driver in the autonomous traveling mode.

In order to accomplish the objective of the disclosure, one aspect of the disclosure provides a foldable accelerator pedal apparatus equipped with a hysteresis module for a vehicle, the apparatus including: a pedal housing fixedly installed in a space below a driver's seat; a pedal pad to rotatably combined with the pedal housing by a hinge pin and operated by a driver's foot; a hysteresis module installed in the pedal housing in a linearly movable manner, connected to the pedal pad, and configured to generate a hysteresis effect when the pedal pad is operated by the driver; and a linear motor equipped with a motor rod fixedly installed in the pedal housing and connected to the hysteresis module, the linear motor generating motive power for reciprocating the motor rod. Through the linear movement of the hysteresis module caused by the reciprocation of the motor rod, the pedal pad retracts into the pedal pad to enter a hidden state where the pedal pad is concealed or protrudes from the pedal housing to enter a pop-up state where the pedal pad is exposed.

The apparatus may further include a printed circuit board ("PCB") fixedly installed in the pedal housing and electrically connected to the linear motor, the PCB functioning to control operation of the linear motor.

In the apparatus, the pedal pad may be an organ-shaped pad having a lower end portion combined with the pedal housing by a hinge pin and an upper end portion that rotates backward and forward about the hinge pin, in which an upper of the hinge pin may be combined with the hysteresis module.

In the apparatus, the pedal housing may have a guide slot extending vertically, and the hysteresis module may have a guide protrusion that is inserted into the guide slot and moves upward and downward along the guide slot.

In the apparatus, the hysteresis module may include: a lever housing having the guide protrusion and combined with the motor rod; a rotation lever having a first end portion having a hinge portion rotatably combined with a center shaft provided in the level housing; a friction bush that is combined with the center shaft, and when the rotation lever rotates, generates a frictional force due to contact with the rotation lever; a connection link that rotatably connects a second end portion of the rotation lever and the pedal pad with each other; and a return spring installed in such a manner that both end portions of the return spring are supported on the lever housing and the rotation lever, respectively.

The apparatus may further include: a permanent magnet combined with the hinge portion of the rotation lever; and a non-contact pedal sensor, fixedly installed in the pedal housing in a manner that faces the permanent magnet, in which the non-contact pedal sensor may detect a rotation angle of the pedal pad through a change in magnetic field strength that depends on a change in position of the permanent magnet, which takes place when the rotation lever rotates, and may generate a signal associated with acceleration.

In the apparatus, the linear motor may be fixedly installed in the pedal housing in a manner that is positioned above the hysteresis module, and when by operation of the linear motor, the motor rod moves backward into the linear motor and the hysteresis module moves to be positioned at an uppermost end of the guide slot, the pedal pad may rotate about the hinge pin and may protrudes from the pedal housing to enter the pop-up state where the pedal pad is exposed.

In the apparatus, the linear motor may be fixedly installed in the pedal housing in a manner that is positioned above the hysteresis module, and when by operation of the linear motor, the motor rod moves forward in a manner that protrudes from the linear motor and the hysteresis module moves to be positioned at a lowermost end of the guide slot, the pedal pad may rotate about the hinge pin and may retract into the pedal housing to enter the hidden state where the pedal pad is concealed.

In the apparatus, when by the reciprocation of the motor rod by operation of the linear motor, the hysteresis module moves and the movement of the hysteresis module changes the position of the permanent magnet, the non-contact pedal sensor may not generate the signal associated with acceleration in order to prevent improper functioning of the pedal.

In the apparatus, in the pop-up state and in a situation where the linear motor does not operate, only when rotation of the pedal pad by a driver's operation changes the position of the permanent magnet, the non-contact pedal sensor may generate the signal associated with acceleration.

According to another aspect of the present disclosure, there is provided a foldable accelerator pedal apparatus equipped with a hysteresis module for a vehicle, the apparatus including: a pedal housing fixedly installed in a space below a driver's seat; a pedal pad rotatably combined with the pedal housing by a hinge pin and configured to be operated by a driver's foot; a rotary motor fixedly installed in the pedal housing and equipped with a motor rod that rotates; and a hysteresis module that is combined with the motor rod and thus rotates together with the motor rod, that is connected to the pedal pad, and that generates a hysteresis effect when a driver operates the pedal pad, in which through rotation of the hysteresis module by the rotary motor, the pedal pad retracts into the pedal housing to enter a hidden state where the pedal pad is concealed or protrudes from the pedal housing to enter a pop-up state where the pedal pad is exposed.

In the apparatus, the pedal pad may be an organ-shaped pad having a lower end portion combined with the pedal housing by a hinge pin and an upper end portion that rotates backward and forward about the hinge pin, in which an upper of the hinge pin may be combined with the hysteresis module.

In the apparatus, the hysteresis module may include: a lever housing combined with the motor rod; a rotation lever having a first end portion having a hinge portion rotatably combined with a center shaft provided in the lever housing; a friction bush that is combined with the center shaft, and when the rotation lever rotates, generates a frictional force due to contact with the rotation lever; a connection link that rotatably connects a second end portion of the rotation lever and the pedal pad with each other; and a return spring of which both end portions are supported on the lever housing and the rotation level, respectively.

The apparatus may further include: a permanent magnet combined with the hinge portion of the rotation lever; and a non-contact pedal sensor fixedly installed in the pedal housing in a manner that faces the permanent magnet, in which the non-contact pedal sensor detects a rotation angle of the pedal pad through a change in magnetic field strength that depends on a change in position of the permanent magnet, which takes place when the rotation lever rotates, and generates a signal associated with acceleration.

In the apparatus, the rotary motor may be fixedly installed in the pedal housing in a manner that is positioned to a lateral side of the hysteresis module, and according to a rotation direction of the motor rod, which depends on operation of the rotary motor, the pedal pad may rotate about the hinge pin and may protrude from the pedal housing to enter the pop-up state where the pedal pad is exposed or retracts into the pedal housing to enter the hidden state where the pedal pad is concealed.

In the apparatus, when the rotation of the hysteresis module by operation of the rotary motor changes a position of the permanent magnet, a non-contact pedal sensor may not generate a signal associated with acceleration in order to prevent improper functioning of the pedal.

In the apparatus, in the pop-up state and in a situation where the rotary motor does not operate, only when rotation of the pedal pad by a driver's operation changes a position of a permanent magnet, a non-contact pedal sensor may generate a signal associated with acceleration.

In the foldable accelerator pedal apparatus of the present disclosure, in a manual driving mode situation where a driver manually drives a vehicle, in order for the driver to be able to operate the pedal pad, the pedal pad protrudes from the pedal housing to be exposed toward the driver. On the other hand, in an autonomous traveling mode situation where the vehicle travels without any human input, in order for the driver not to be able to operate the pedal pad, the pedal pad retracts into the pedal housing to enter the hidden state where the pedal pad is concealed and is not exposed toward the driver. In the autonomous traveling mode situation, this configuration provides the advantages of enabling the driver to rest comfortably and preventing an unintentional operation of the pedal to ensure the safety of the driver.

DETAILED DESCRIPTION OF THE DISCLOSURE

Figure 1:
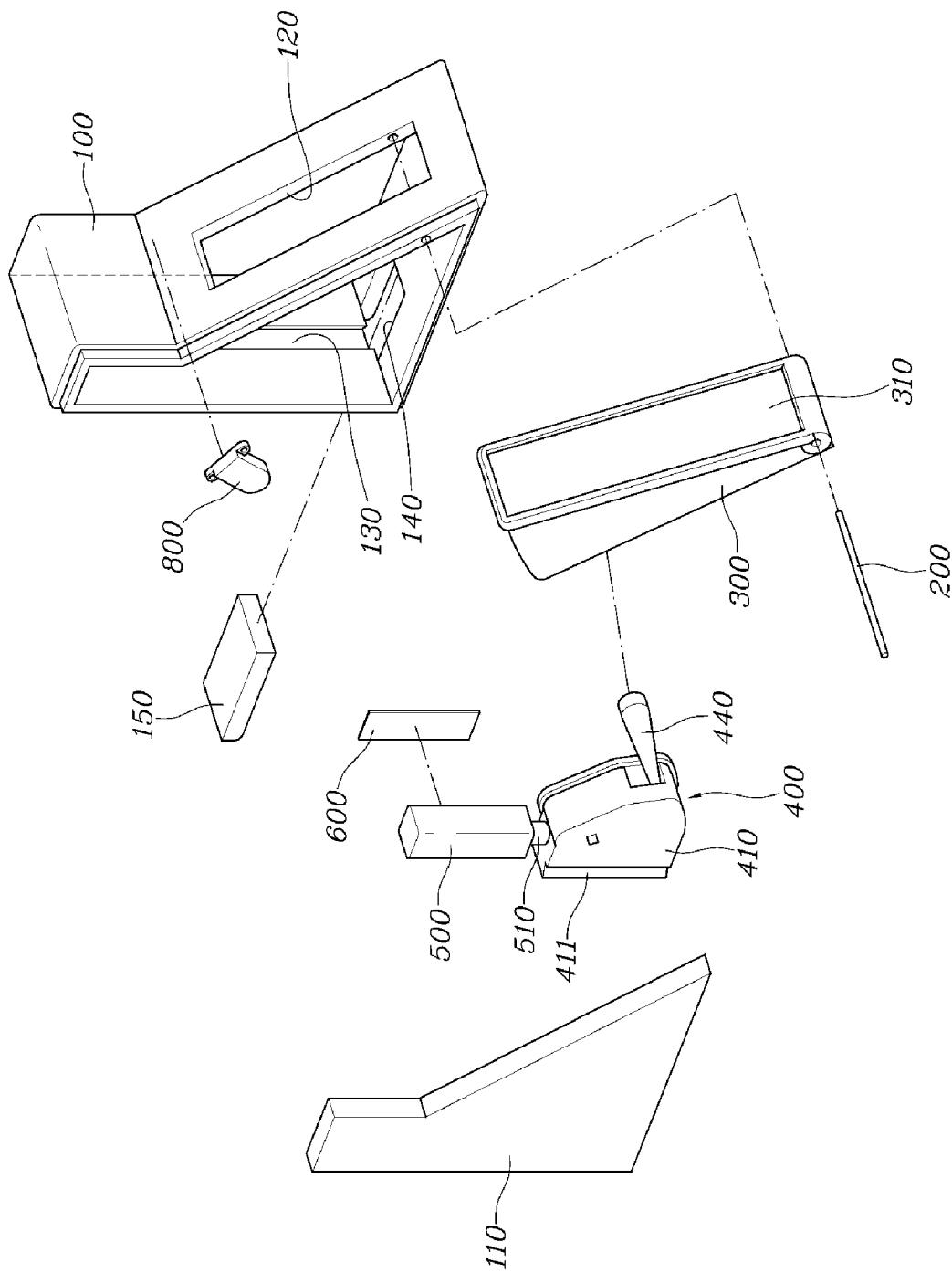
FIG. 1 is an exploded perspective view illustrating a foldable accelerator pedal apparatus in accordance with one embodiment of the present disclosure, the apparatus being equipped with a hysteresis module and a linear motor.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

A foldable accelerator pedal apparatus equipped with a hysteresis module for a vehicle, in accordance with a preferable embodiment of the present disclosure, will be described below with reference to the accompanying drawings.

A foldable accelerator pedal apparatus according to a first embodiment of the present disclosure, as illustrated in FIGS. 1 to 7, includes a pedal housing 100, a pedal pad 300, a hysteresis module 400, and a linear motor 500. The pedal housing 100 is fixedly installed in a space below a driver's seat. The pedal pad 300 is rotatably combined with the pedal housing 100 by a hinge pin 200 in between and is configured to be operated by a driver's foot. The hysteresis module 400 is installed in the pedal housing 100 in a linearly movable manner and is connected to the pedal pad 300. When a driver operates the pedal pad 300, the hysteresis module 400 generates hysteresis. The linear motor 500 includes a motor rod 510 and generates motive power for reciprocating the motor rod 510. The motor rod 510 is fixedly installed in the pedal housing 100 and is connected to the hysteresis module 400.

Through linear movement of the hysteresis module 400 by reciprocation of the motor rod to 510, the pedal pad 300 switches between a hidden state where the pedal pad 300 is concealed in the pedal housing 100 and a pop-up state where the pedal pad 300 is exposed.

The pedal housing 100 preferably is in the form of an empty box and has one open side. The hysteresis module 400, the linear motor 500, a printed circuit board (PCB), and a non-contact pedal sensor that will be described below are installed within empty space in the pedal housing 100. A side-surface cover 110 is removably combined with the open side of the pedal housing 100.

The linear motor 500 is electrically connected to a power supply. The motor rod 510 is a plunger that reciprocates upward and downward when the linear motor 500 operates.

In addition, the foldable accelerator pedal apparatus of the present disclosure may further include a PCB 600 that is fixedly installed in the pedal housing 100, is electrically connected to the linear motor 500, and controls operation of the linear motor 500.

The PCB 600 is electrically connected to the power supply such as a battery through wiring.

The pedal pad 300 preferably is an organ-shaped pad of which a lower end portion is rotatably combined with the pedal housing 100 with the hinge pin 200 and of which an upper end portion rotates backward and forward about the hinge pin 200. An upper portion of the hinge pin 200 is rotatably combined with the hysteresis module 400.

The pedal housing 100 has a housing hole 120 in a rear surface of the pedal housing 100 facing the driver. The lower end portion of the pedal pad 300 is rotatably combined with the pedal housing 100 with the hinge pin 200, so that the pedal pad 300 passes through the housing hole 120.

Therefore, operating power of the linear motor 500 is transferred to the pedal pad 300 through the motor rod 510 and the hysteresis module 400. When the pedal pad 300 rotates forward about the hinge pin 200, the pedal pad 300 retracts into the pedal housing 100 to enter the hidden state where the pedal pad 300 is concealed and where it is impossible for the driver to operate the pedal pad 300. Conversely, when the pedal pad 300 rotates backward in a manner that faces the driver, the pedal pad 300 protrudes from the pedal housing 300 to enter the pop-up state where the pedal pad 300 is exposed and where it is possible for the driver to operate the pedal pad 300.

A rear surface of the pedal pad 300, which faces the driver, is an operation surface 310 on which the driver puts his/her foot to operate the pedal pad 300. The operation surface 310 of the pedal pad 300 has a greater external size than the housing hole 120. When the pedal pad 300 rotates, the housing hole 120 is covered by the operation surface 310 of the pedal pad 300.

When the pedal pad 300 fully rotates forward about the hinge pin 200, the operation surface 310 of the pedal pad 300 does not pass through the housing hole 120. Therefore, the operation surface 310 is supported on the pedal housing 100. Thus, the pedal pad 300 is naturally prevented from rotating forward.

In addition, the covering of the housing hole 120 by the operation surface 310 of the pedal pad 300 provides the advantage that the pedal housing 100 becomes airtight. This can prevent a foreign object from being introduced into the pedal housing 100 and can prevent noise from coming into the vehicle from outside.

A guide slot 130 extends vertically in an inner surface of a front side of the pedal housing 100, the inner surface facing the housing hole 120. The hysteresis module 400 is installed in a manner that is movable upward and downward along the guide slot 130. To that end, the hysteresis module 400 has a guide protrusion 411 that is inserted into the guide slot 130 and moves upward and downward along the guide slot 130.

The pedal housing 100 has a lower hole 140 in a bottom surface of the pedal housing 100. The lower hole 140 communicates with a lower end portion of the guide slot 130. This structure makes it possible for the hysteresis module 400 to be inserted into the pedal housing 100 through the lower hole 140. The guide protrusion 411 is accordingly inserted into the guide slot 130.

A lower cover 150 combined with the bottom surface of the pedal housing 100 covers the lower hole 140, and thus the hysteresis module 400 is prevented from being separated.

The guide slot 130 has both tapered side surfaces. The guide protrusion 411 has both tapered side surfaces brought in contact with both the side surfaces, respectively, of the guide slot 130. Accordingly, the hysteresis module 400 is movable only in the downward-upward direction along the guide slot 130 and cannot move backward toward the housing hole 120. Thus, the hysteresis module 400 is prevented from being separated from the guide slot 130.

The hysteresis module 400 used in the present disclosure includes a lever housing 410, a rotation lever 420, a friction bush 430, a connection link 440, and a return spring 450. The lever housing 410 has the guide protrusion 411 to be inserted into the guide slot 130 and is combined with the motor rod 510. A first end portion (i.e., a hinge portion 421) of the rotation lever 420 is rotatably combined with a center shaft 412 provided in the lever housing 410. The friction bush 430 is combined with the center shaft 412. Thus, when the rotation lever 420 rotates, the friction bush 430 generates a frictional force due to contact with the rotation lever 420. The connection link 440 rotatably connects a second end portion of the rotation lever 420 and the pedal pad 300 to each other. The return spring 450 is installed in such a manner that both end portions of the return spring 450 are supported on the lever housing 410 and the rotation lever 420, respectively.

Both end portions of the connection link 440 are combined with the rotation lever 420 and the pedal pad 300, respectively, in a manner that is rotatable by a hinge mechanism.

The driver depresses the pedal pad 300 with his/her foot. When depressed, the pedal pad 300 rotates forward about the hinge pin 200. At this time, a rotational force of the pedal pad 300 is transferred to the rotation lever 420 through the connection link 440. The rotation lever 420 in turn rotates about the center shaft 412. As a result, the return spring 450 is compressed and stores an elastic force. When the driver releases the pedal pad 300, a restoring force of the return spring 450 returns the rotation lever 420, the connection link 440, and the pedal pad 300 to their initial positions, respectively.

Pedal effort may be adjusted by tuning a spring force of the return spring 450. Particularly, two springs with different spring forces are preferably provided to suppress slight shaking of the pedal pad 300. However, the number of springs is not limited to 2.

The return spring 450 is preferably a compression coil spring.

When the driver depresses the pedal pad 300 with his/her foot, the spring force (compression force) of the return spring 450 and the frictional force of the friction bush 430 occur at the same time and act as a resistance force. Significant pedal effort (pedal effort at work when depressing the pedal pad) is accordingly necessary to overcome this resistance force. When the driver releases the pedal pad 300 and thus the pedal pad 300 returns to its initial state, only the frictional force of the friction bush 430 occurs. Thus, pedal effort at this time (a pedal effort at work when the pedal pad returns to its initial state) becomes relatively smaller than the pedal effort (the pedal effort at work when depressing the pedal pad).

This phenomenon, referred to as hysteresis in a pedal apparatus, occurs due to the friction bush 430 corresponding to a friction element that is involved in the pedal effort at work when depressing the pedal pad and the pedal effort at work when releasing the pedal pad.

Hysteresis in an accelerator pedal, which is a necessary element, prevents an amount of depression of the accelerator pedal from suddenly changing when a shock occurs due to a bump or the like on a road. This ensures relatively quiet, consistent traveling of the vehicle. Particularly, the hysteresis makes it possible to maintain a fixed amount of depression of a pedal arm when traveling at a fixed speed or when traveling for a long time. This relieves muscular fatigue of a driver's ankle.

According to the present disclosure, the hysteresis module 400 is installed in the pedal housing 100 in a contact manner by combining the guide slot 130 and the guide protrusion 411 with each other. The hysteresis module 400 is positioned, between the motor rod 510 and the pedal pad 300, below the linear motor 500. With this configuration, when the driver depresses the pedal pad 300 with his/her foot, most of a driver's operating force is resisted by the pedal housing 100. This provides the advantage that the size of the linear motor 500 is minimized and that a cost-saving reduction in weight may be achieved.

In addition, the foldable accelerator pedal apparatus of the present disclosure may further include a permanent magnet 700 combined with the hinge 421 of the rotation lever 420, and a non-contact pedal sensor 800 that is fixedly installed in the pedal housing 100 in a manner that faces the permanent magnet 700.

The non-contact pedal sensor 800 may be an accelerator position sensor (APS) that detects rotation of the rotation lever 420 when the driver depresses the pedal pad 300 with his/her foot.

A PCB is provided within the non-contact pedal sensor 800 in a manner that faces the permanent magnet 700. The PCB is electrically connected via a wire to a power supply, such as a battery.

Therefore, the non-contact pedal sensor 800 detects a rotation angle of the pedal pad 300 through a change in magnetic field strength that depends on a change in position of the permanent magnet 700 that takes place when the rotation lever 420 rotates, and generates a signal associated with acceleration.

By comparison with a contact sensor connected directly through a link or the like, the non-contact pedal sensor 800 has the advantage that operation noise is decreased and that particularly, the precision of an output signal is further increased.

Figure 2:
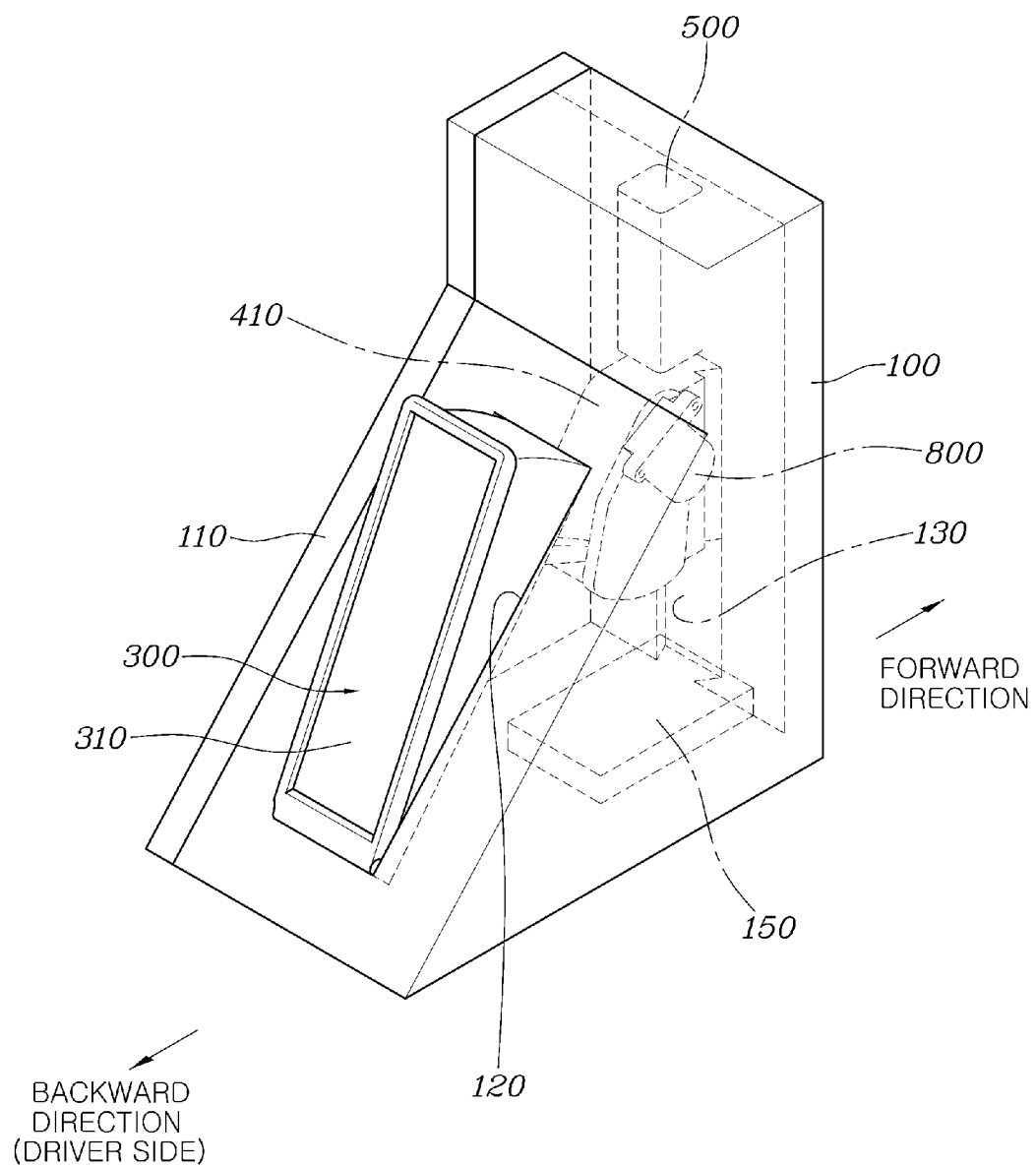
FIG. 2 is a perspective view illustrating an assembled state of the apparatus of FIG. 1.
Figure 3:
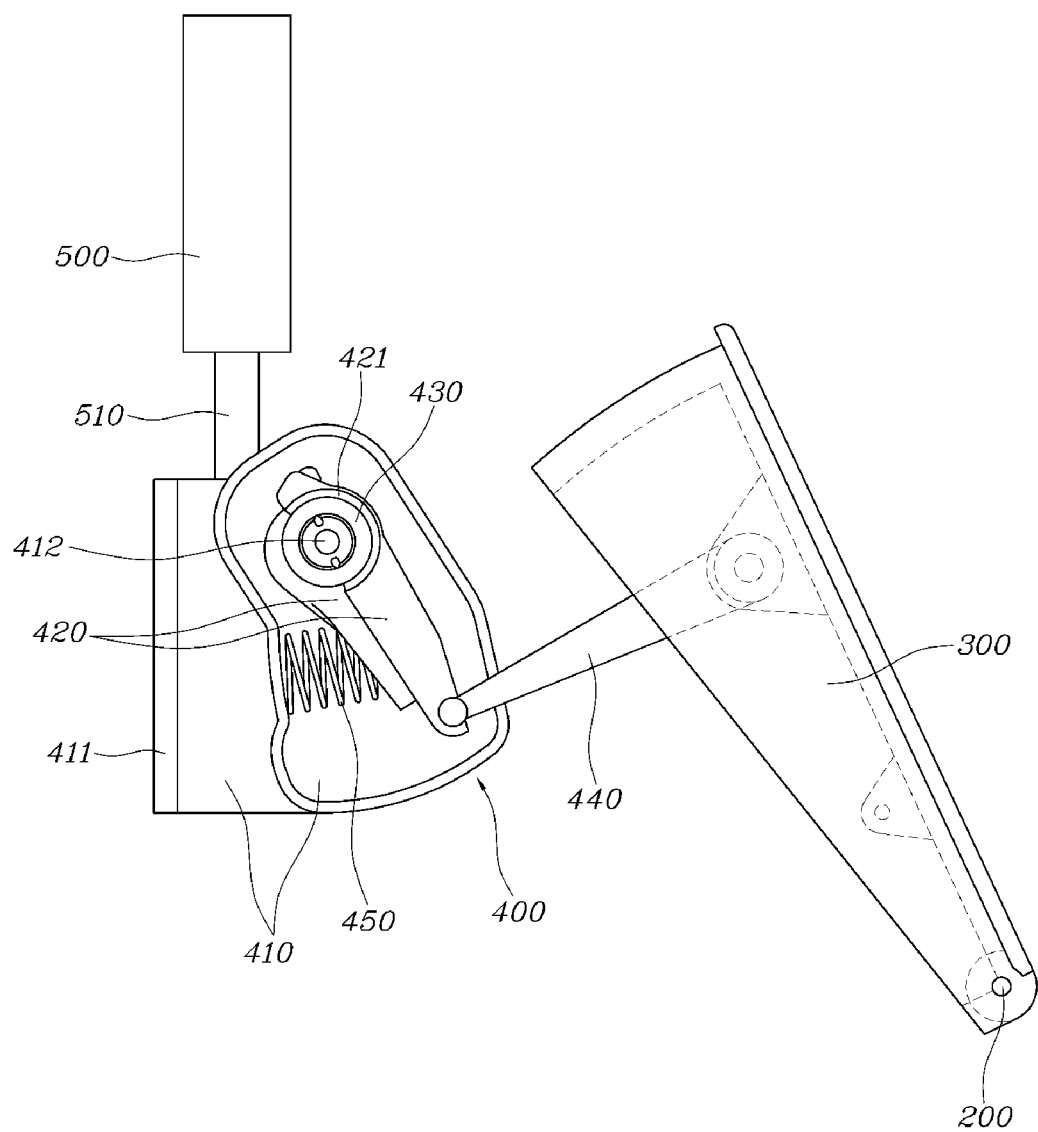
FIG. 3 is a view illustrating the hysteresis module in FIG. 1.
Figure 4:
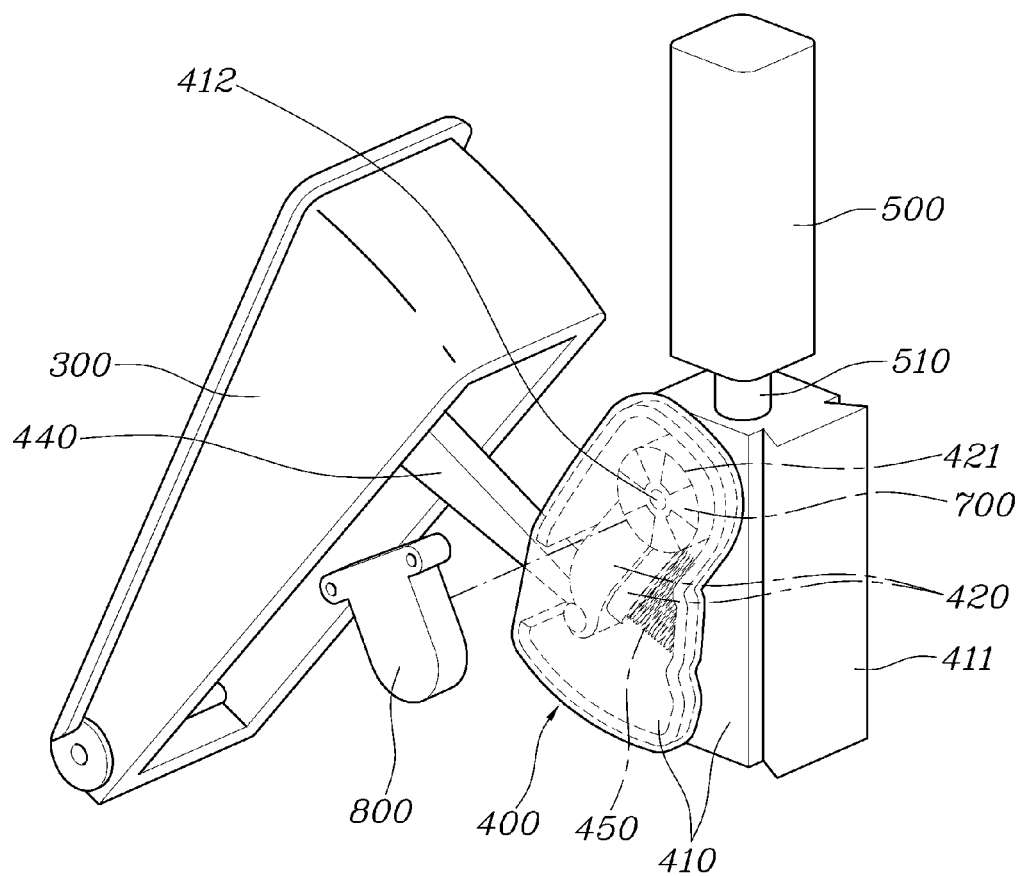
FIG. 4 is a view illustrating the hysteresis module when viewed from a direction opposite to a direction from which the hysteresis module in FIG. 3 is viewed.
Figure 5:
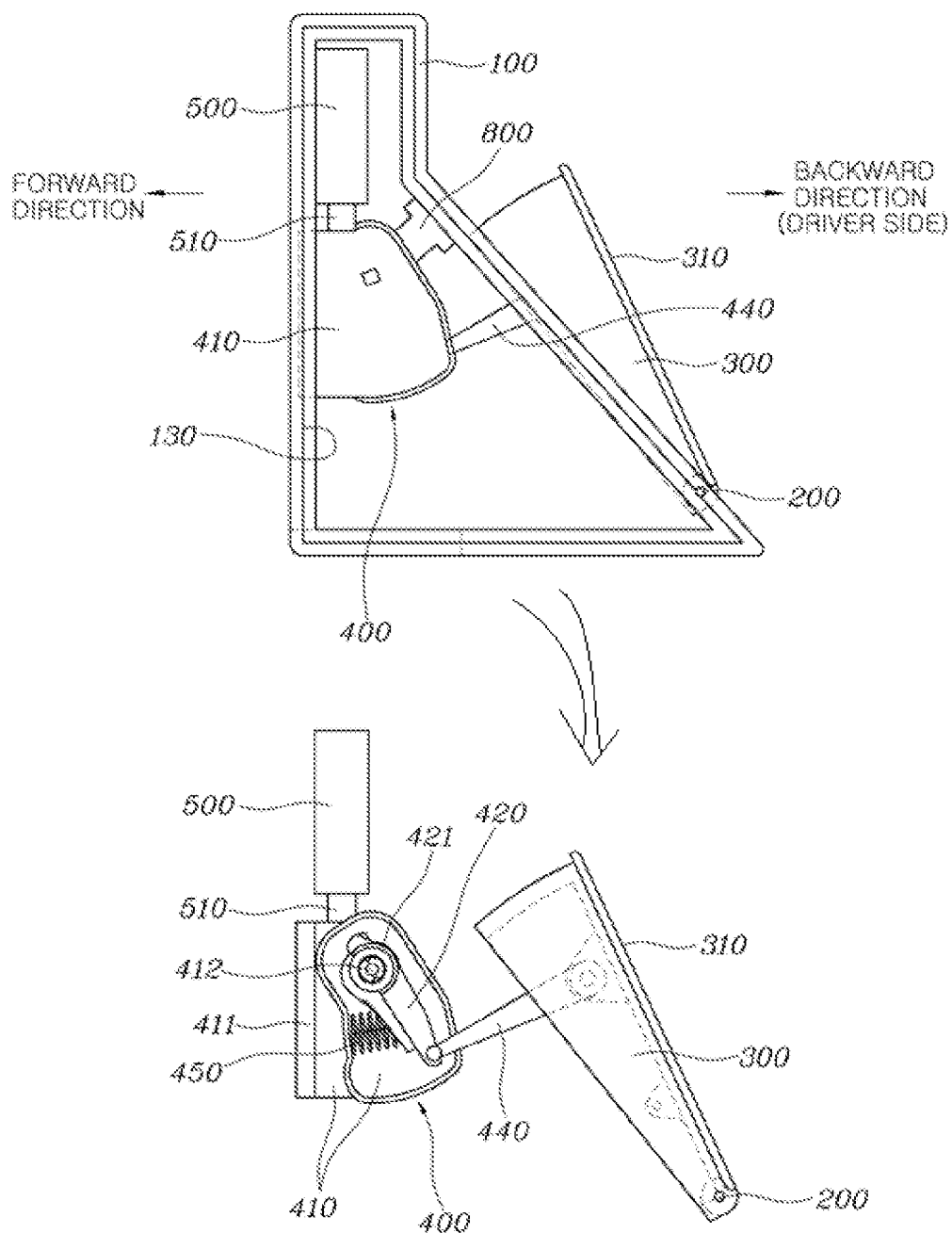
FIG. 5 is a view illustrating a pop-up state where a pedal pad is exposed after protruding from a pedal housing and a view illustrating a state where a pedal housing is omitted therefrom.

FIGS. 2 and 5 illustrate that the pedal pad 300 rotates backward in a manner that faces the driver and enters the pop-up state where the pedal pad 3000 protrudes from the pedal housing 100.

By operation of the linear motor 500 that is fixedly installed in the pedal housing 100 in a manner that is positioned above the hysteresis module 400, the motor rod 510 moves backward into the linear motor 500 (a state where the motor rod 510 moves upward), and the hysteresis module 400 moves along the guide slot 130 and is positioned at an uppermost end of the guide slot 130. At this time, the pedal pad 300 rotates backward about the hinge pin 200 in a manner that faces the driver and thus enters the pop-up state where the pedal pad 30 protrudes from the pedal housing 100.

As illustrated in FIG. 5, when the pedal pad 300 enters the pop-up state where the pedal pad 300 protrudes from the pedal housing 100, the driver pushes down on the operation surface 310 of the protruding pedal pad 3000 with his/her foot and performs a normal operation.

Figure 6:
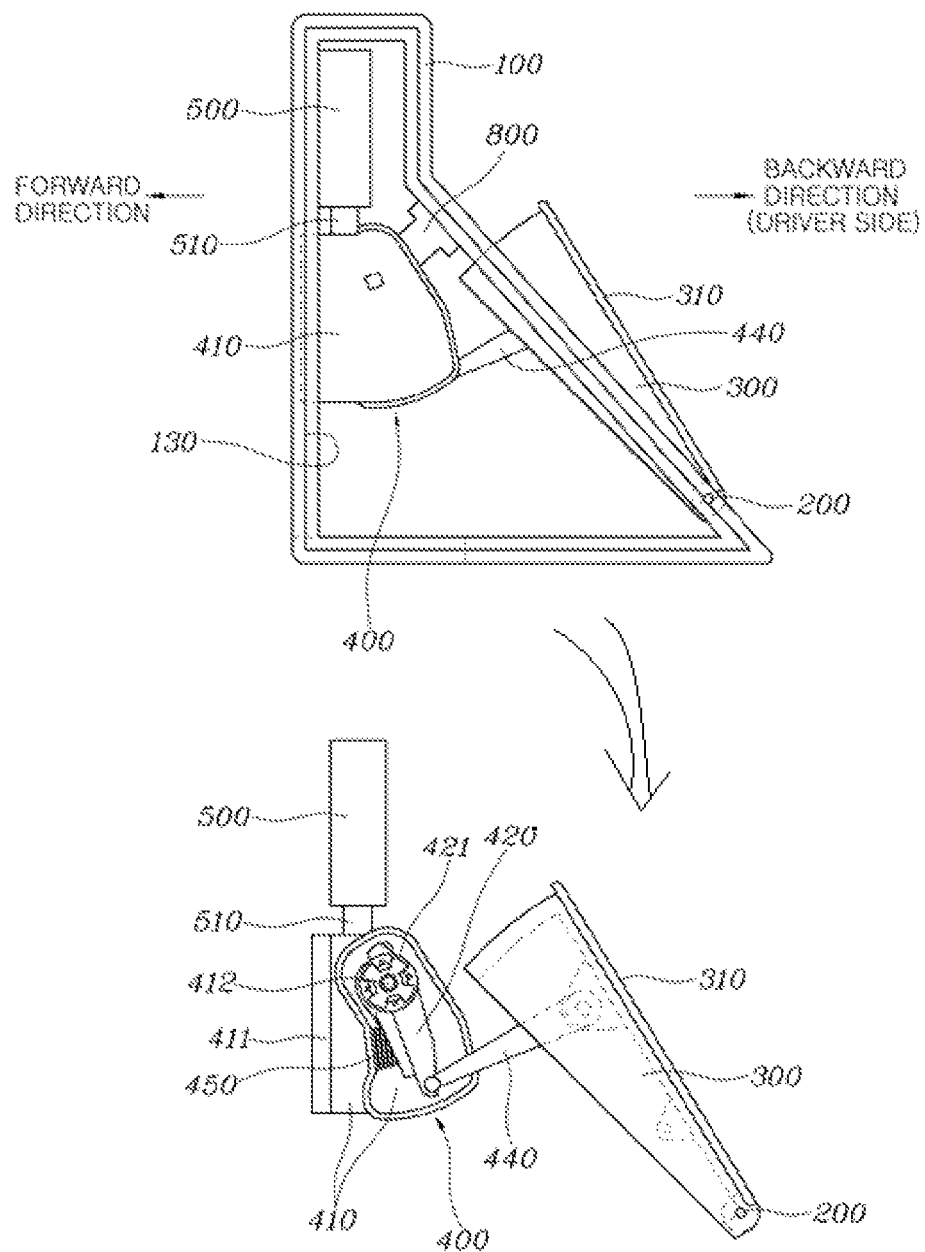
FIG. 6 is a view illustrating a state where the pedal pad in FIG. 5 rotates by a driver' operation and operates normally and a view illustrating a state where a pedal housing is omitted therefrom.

FIG. 6 illustrates a state where the driver depresses the pedal pad 300 that pops up in a manner that protrudes from the pedal housing 100.

When the driver depresses the pedal pad 300 that pops up in a manner that protrudes from the pedal housing 100, the pedal pad 300 rotates forward about the hinge pin 200 and the rotational force of the pedal pad 300 is transferred to the rotation lever 420 through the connection link 440. Thus, the rotation lever 420 rotates about the center shaft 412. At this time, the return spring 450 is compressed.

In addition, when the rotation of the pedal pad 300 by a driver's operation rotates the rotation lever 420, the permanent magnet 700 combined with the hinge 421 of the rotation lever 420 rotates together with the rotation lever 420 and this rotation changes a position of the permanent magnet 700. At this time, the non-contact pedal sensor 800 detects the rotation angle of the pedal pad 300 through a change in magnetic field strength that depends on a change in rotation position of the permanent magnet 700 and generates the signal associated with acceleration.

Figure 7:
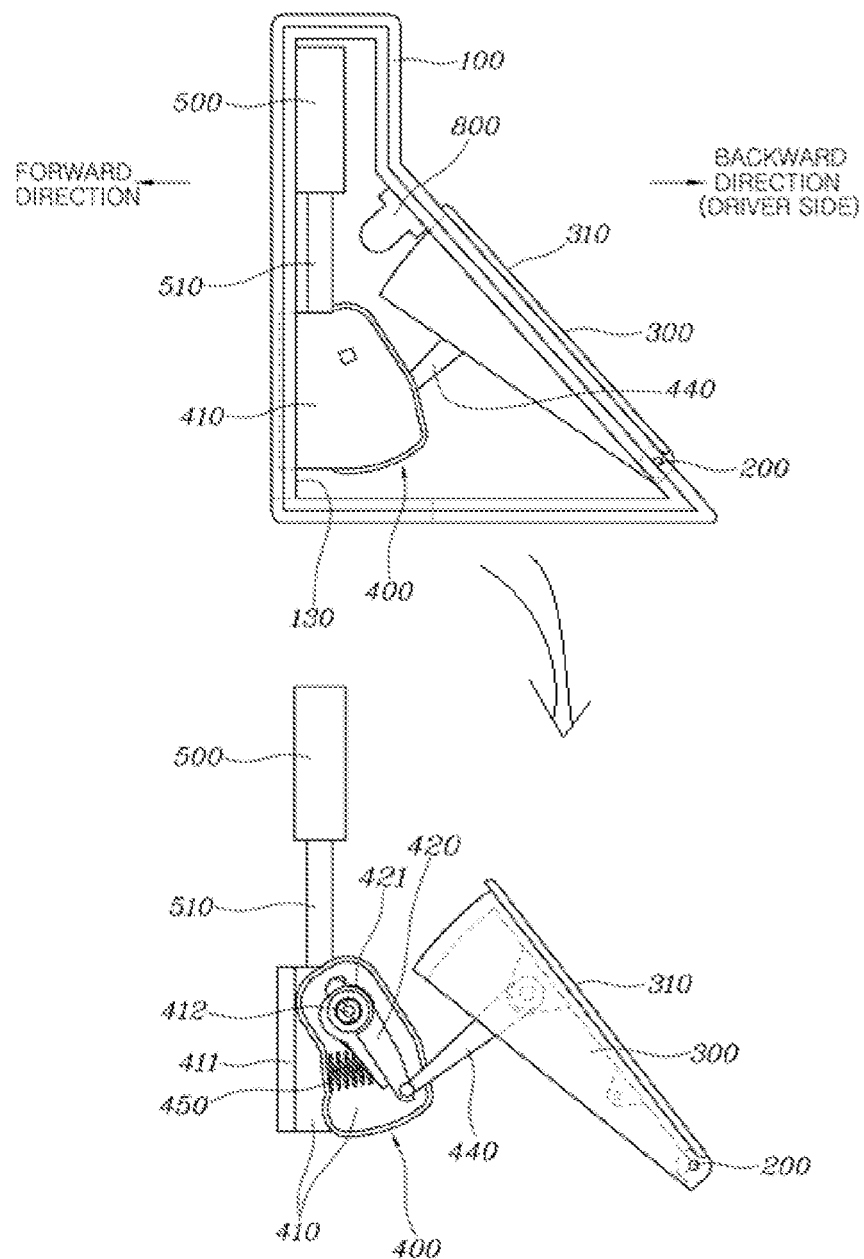
FIG. 7 is a view illustrating a hidden state where the pedal pad in FIG. 5 is concealed after retracting into the pedal housing and a view illustrating a state where a pedal housing is omitted therefrom.

FIG. 7 illustrates that by operation of the linear motor 500, the pedal pad 300 rotates forward and retracts into the pedal housing to enter the hidden state where the pedal pad 300 is concealed and is accordingly prevented from being exposed to the outside.

By operation of the linear motor 500 that is fixedly in the pedal housing 100 in a manner that is positioned above the hysteresis module 400, the motor rod 510 moves forward in a manner that protrudes from the linear motor 500 (a state where the motor rod 510 moves downward), and the hysteresis module 400 moves along the guide slot 130 and is positioned at a lowermost end of the guide slot 130. At this time, the pedal pad 300 rotates forward about the hinge pin 200 and thus retracts into the pedal pad 300 to enter the hidden state where the pedal pad 300 is concealed.

When as illustrated in FIG. 7, the hidden state where the pedal pad 300 is concealed is entered, the space below the driver's seat becomes a wide space in which there is no interference of the pedal. Thus, the driver can rest comfortably in a relaxation mode. Furthermore, the pedal can be prevented from improper functioning in an autonomous traveling situation, thereby improving the safety of the driver.

According to an embodiment of the present disclosure, the reciprocation of the motor rod 510 by the operation of the linear motor 500 moves the hysteresis module 400 and the movement of the hysteresis module 400 in turn changes the position of the permanent magnet 700. At this time, the non-contact pedal sensor 800 does not generate the signal associated with acceleration in order to prevent improper functioning of the pedal.

That is, by operation of the linear motor 500, the pedal pad 300 changes to the pop-up state as illustrated in FIG. 5 or the hidden state as illustrated in FIG. 7. At this time, although the position of the permanent magnet 700 changes, the non-contact pedal sensor 800 does not generate a signal associated with acceleration. Thus, an accident due to the improper functioning of the pedal can be prevented.

However, as illustrated in FIG. 6, in the state where the pedal pad 300 pops up and in a situation where the linear motor 500 does not operate, by the driver's operation, the pedal pad 300 rotates, and thus the rotation lever 420 rotates and the rotation of the rotation lever 420 changes the position of the permanent magnet 700. Only at this time, the non-contact pedal sensor 800 generates the signal associated with acceleration. Thus, stable operation of the pedal may be ensured.

To that end, a sensor that detects a position of the motor rod 510 is provided in the linear motor 500. The non-contact pedal sensor 800 determines whether or not the signal associated with acceleration is generated, using positional information of the motor rod 510, which is detected through the sensor 800.

A foldable accelerator pedal apparatus according to a second embodiment of the present disclosure, as illustrated in FIGS. 8 to 14, includes a pedal housing 1000, a pedal pad 3000, a rotary motor 5000, and a hysteresis module 4000. The pedal housing 1000 is fixedly installed in a space below a driver's seat. The pedal pad 3000 is rotatably combined with the pedal housing 1000 by a hinge pin 2000 in between and is configured to be operated by a driver's foot. The rotary motor 5000 includes a motor rod that is fixedly in the pedal housing 1000 and rotates. The hysteresis module 4000 is combined with the motor rod 4100 and thus rotates together with the motor rod 4100, and is connected to the pedal pad 3000 and thus, when a driver operates the pedal pad 3000, generates hysteresis.

When the rotary motor 5000 drives, through rotation of the hysteresis module 4000 by rotation of the motor rod 5100, the pedal pad 3000 can be switched between the hidden state and the pop-up state. That is, the pedal pad 3000 retracts into the pedal housing 1000 to be concealed or protrudes from the pedal housing 1000 to be exposed.

The pedal housing 1000 preferably is in the form of an empty box and has one open side. The hysteresis module 4000, the rotary motor 5000, a non-contact pedal sensor that will be described below, and the like are installed within empty space in the pedal housing 1000. A side-surface cover 1100 is removably combined with the open side of the pedal housing 1000.

The rotary motor 5000, for example, is a step motor, and is electrically connected to a power supply. When the rotary motor 5000 operates, the motor rod 5100 rotates clockwise or counterclockwise.

The pedal pad 3000 preferably is an organ-shaped pad of which a lower end portion is rotatably combined with the pedal housing 1000 with the hinge pin 2000 and of which an upper end portion rotates backward and forward about the hinge pin 2000. An upper portion of the hinge pin 2000 is rotatably combined with the hysteresis module 4000.

The pedal housing 1000 has a housing hole 1200 in a rear surface of the pedal housing 1000 facing the driver. The lower end portion of the pedal pad 3000 is rotatably combined with the pedal housing 1000 with the hinge pin 2000 in between, so that the pedal pad 3000 passes through the housing hole 1200.

Therefore, operating power of the rotary motor 5000 is transferred to the pedal pad 3000 through the motor rod 5100 and the hysteresis module 4000. When the pedal pad 3000 rotates forward about the hinge pin 2000, the pedal pad 3000 retracts into the pedal housing 1000 to enter the hidden state where the pedal pad 3000 is concealed and where it is impossible for the driver to operate the pedal pad 3000. Conversely, when the pedal pad 3000 rotates backward in a manner that faces the driver, the pedal pad 300 protrudes from the pedal housing 1000 to enter the pop-up state where the pedal pad is exposed and where it is possible for the driver to operate the pedal pad 3000.

A rear surface of the pedal pad 3000, which faces the driver, is an operation surface 3100 on which the driver puts his/her foot to operate the pedal pad 3000. The operation surface 3100 of the pedal pad 3000 has a greater external size than the housing hole 1200. When the pedal pad 3000 rotates, the housing hole 1200 is covered by the operation surface 3100 of the pedal pad 300.

When the pedal pad 3000 fully rotates forward about the hinge pin 2000, the operation surface 3100 of the pedal pad 3000 does not pass through the housing hole 1200. Therefore, the operation surface 3100 is supported on the pedal housing 1000. Thus, the pedal pad 3000 is naturally prevented from rotating forward.

In addition, the covering of the housing hole 1200 by the operation surface 3100 of the pedal pad 3000 provides the advantage that the pedal housing 100 becomes airtight. This can prevent foreign material from being introduced into the pedal housing 100 and can prevent the noise from coming into the vehicle from outside.

The hysteresis module 4000 according to the present disclosure includes a lever housing 4100, a rotation lever 4200, a friction bush 4300, a connection link 4400, and a return spring 4500. The lever housing 4100 is combined with the motor rod 5100. A first end portion of the rotation lever 4200, that is, a hinge 4210 of the rotation lever 4200 is rotatably combined with a center shaft 4120 provided in the lever housing 4100. The friction bush 4300 is combined with the center shaft 4120. Thus, when the rotation lever 4200 rotates, the friction bush 4300 generates a frictional force due to contact of the friction bush 4300 with the rotation lever 4200. The connection link 4400 rotatably connects a second end portion of the rotation lever 4200 and the pedal pad 3000 to each other. The return spring 4500 is installed in such a manner that both end portions of the return spring 4500 are supported on the lever housing 4100 and the rotation lever 4200, respectively.

Both end portions of the connection link 4400 are combined with the rotation lever 4200 and the pedal pad 3000, respectively, in a manner that is rotatable by a hinge mechanism.

The driver depresses the pedal pad 3000 with his/her foot. When depressed, the pedal pad 3000 rotates forward about the hinge pin 2000. At this time, a rotational force of the pedal pad 3000 is transferred to the rotation lever 4200 through the connection link 4400. The rotation lever 4200 in turn rotates about the center shaft 4120. At this time, the return spring 4500 is compressed and stores an elastic force. When the driver releases the pedal pad 3000, a restoring force of the return spring 4500 returns the rotation lever 4200, the connection link 4400, and the pedal pad 3000 to their initial positions, respectively.

A pedal effort may be adjusted by tuning a spring force of the return spring 4500. Particularly, two springs with different spring forces are preferably provided to suppress slight shaking of the pedal pad 3000. However, the number of springs is not limited to 2.

The return spring 4500 is preferably a compression coil spring.

When the driver depresses the pedal pad 3000 with his/her foot, the spring force (compression force) of the return spring 4500 and the frictional force of the friction bush 4300 occur at the same time and act as a resistance force. A significant pedal effort (a pedal effort at work when depressing the pedal pad) is accordingly necessary to overcome this resistance force. When the driver releases the pedal pad 3000 and thus the pedal pad 3000 returns to its initial state, only the frictional force of the friction bush 4300 occurs. Thus, a pedal effort at this time (a pedal effort at work when the pedal pad returns to its initial state) becomes relatively smaller than the pedal effort (the pedal effort at work when depressing the pedal pad).

This phenomenon, referred to as hysteresis in a pedal apparatus, occurs due to the friction bush 4300 corresponding to a friction element that is involved in the pedal effort at work when depressing the pedal pad and the pedal effort at work when releasing the pedal pad.

Hysteresis in an accelerator pedal, which is a necessary element, prevents an amount of depression of the accelerator pedal from suddenly changing when a shock occurs due to a bump or the like on a road. This ensures relatively consistent, quiet traveling of the vehicle. Particularly, the hysteresis makes it possible to maintain a fixed amount of depression of a pedal arm when traveling at a fixed speed or when traveling for a long time. This relieves muscular fatigue of a driver's ankle.

In addition, the foldable accelerator pedal apparatus of the present disclosure may further include a permanent magnet 7000 combined with the hinge 4210 of the rotation lever 4200, and a non-contact pedal sensor 8000 that is fixedly installed in the pedal housing 1000 in a manner that faces the permanent magnet 7000.

The non-contact pedal sensor 8000 may be an accelerator position sensor (APS) that detects rotation of the rotation lever 4200 when the driver depresses the pedal pad 3000 with his/her foot.

A PCB is provided within the non-contact pedal sensor 8000 in a manner that faces the permanent magnet 7000. The PCB is electrically connected, through a wire, to a power supply, such as a battery.

The PCB of the non-contact pedal sensor 8000 has a function of controlling driving by the rotary motor 5000.

Therefore, the non-contact pedal sensor 8000 detects a rotation angle of the pedal pad 3000 through a change in magnetic field strength that depends on a change in position of the permanent magnet 7000 that takes place when the rotation lever 4200 rotates, and generates a signal associated with acceleration.

By comparison with a contact sensor connected directly through a link or the like, the non-contact pedal sensor 8000 has the advantage that operation noise is decreased and that particularly, the precision of an output signal is further increased.

Figure 8:
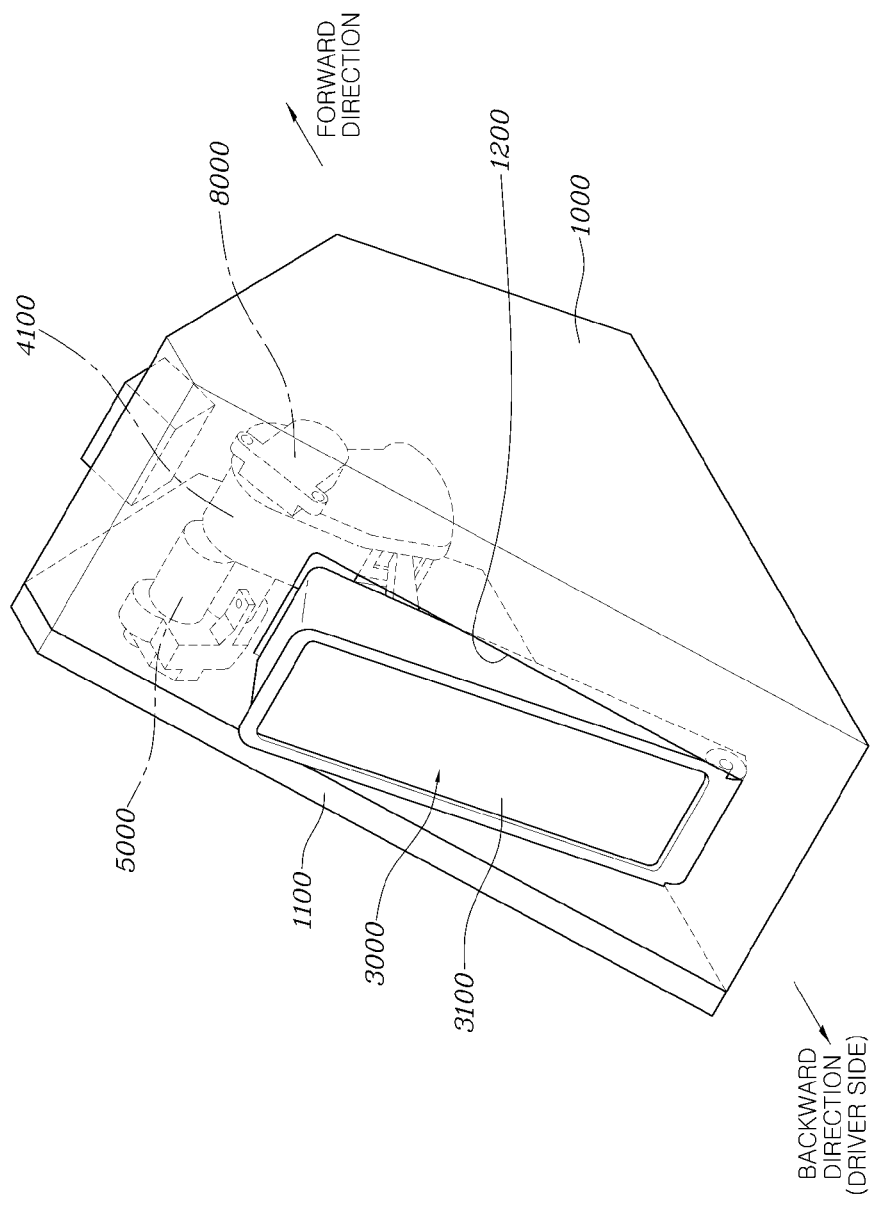
FIG. 8 is a perspective view illustrating a foldable accelerator pedal apparatus in accordance with another embodiment of the present disclosure, the pedal apparatus being equipped with a hysteresis module and a rotary motor.
Figure 9:
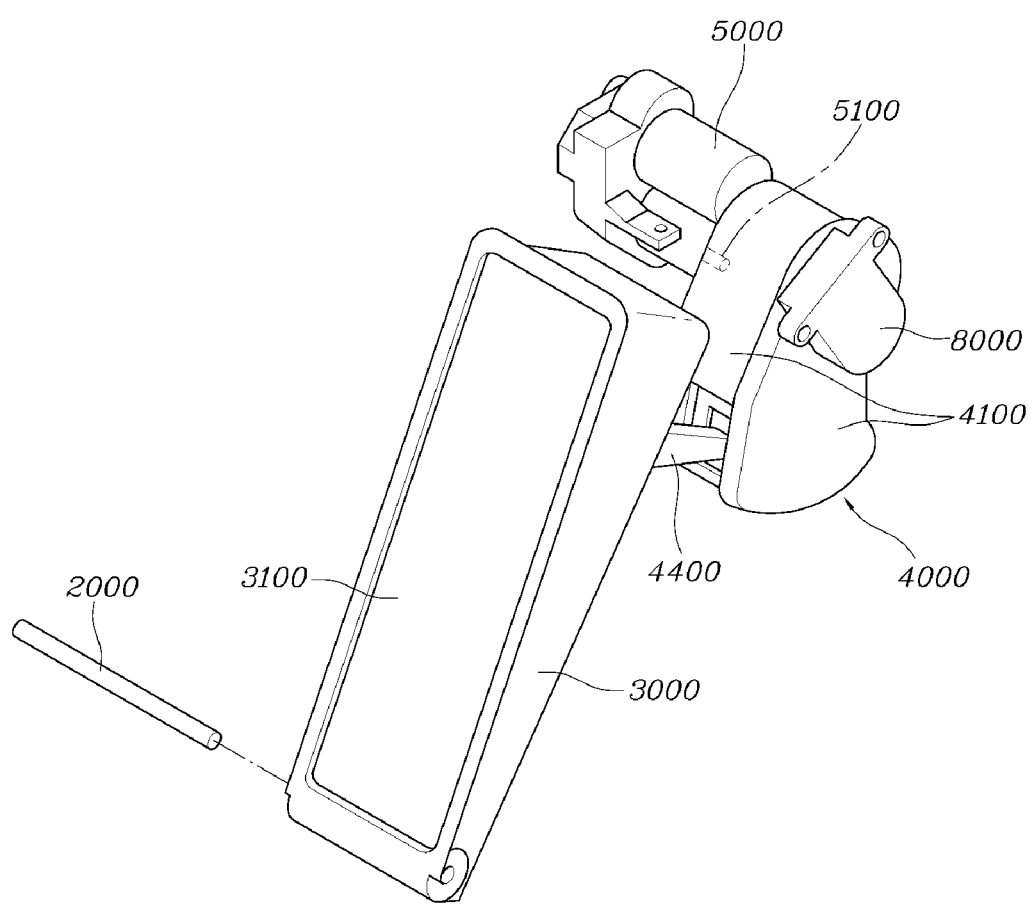
FIG. 9 is a view illustrating a state where a pedal housing is omitted from FIG. 8.
Figure 10:
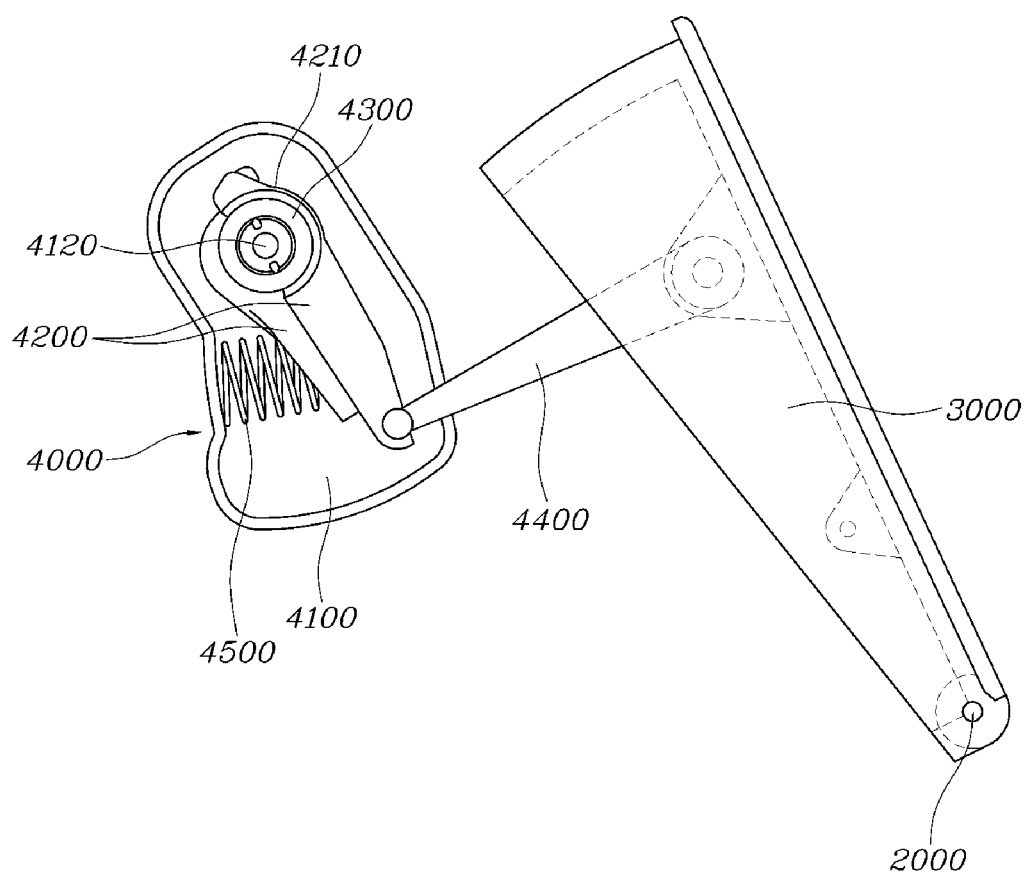
FIG. 10 is a view illustrating the hysteresis module in FIG. 8.
Figure 11:
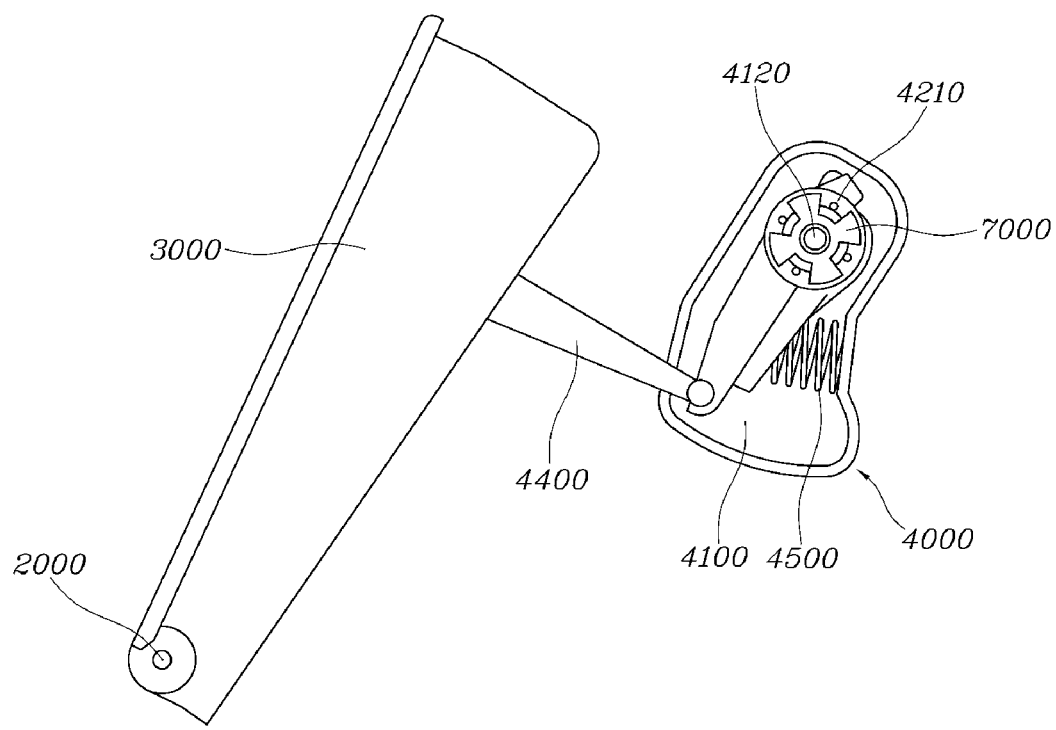
FIG. 11 is a view illustrating the hysteresis module when viewed from a direction opposite to a direction from which the hysteresis module in FIG. 10 is viewed.
Figure 12:
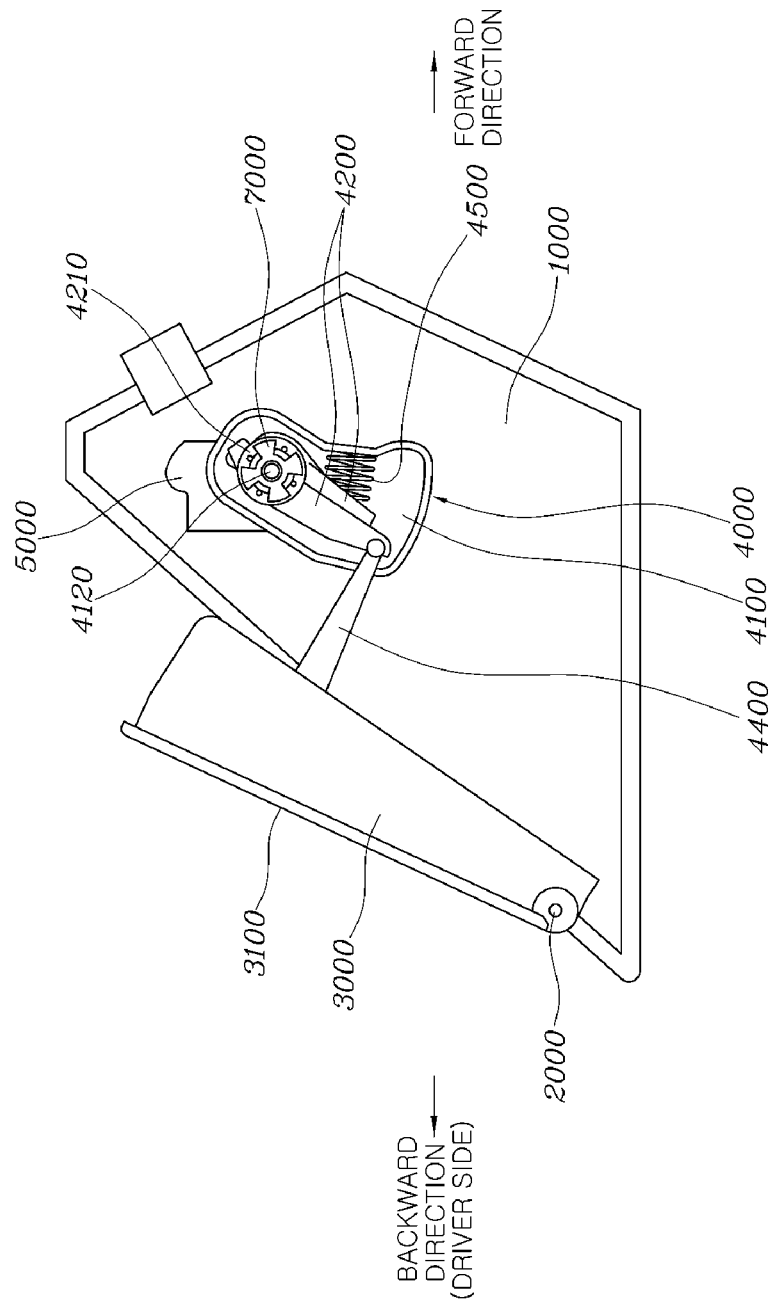
FIG. 12 is a view illustrating a pop-up state where a pedal pad protrudes from the pedal housing to be exposed in a vehicle.

FIGS. 8 and 12 illustrate that the pedal pad 3000 rotates backward in a manner that faces the driver and enters the pop-up state where the pedal pad 3000 protrudes from the pedal housing 100.

The rotary motor 5000 is fixedly installed in the pedal housing 1000 in a manner that is positioned to a lateral side of the hysteresis module 4000, and is connected to the hysteresis module 4000 through the motor rod 5100. With this configuration, when the rotary motor 5000 operates, the rotation of the motor rod 5100 rotates the hysteresis module 4000 (clockwise), and the rotation of the hysteresis module 4000 in turn causes the pedal pad 3000 connected through the connection link 4400 to rotate backward about the hinge pin 2000 in a manner that faces the driver. Thus, the pedal pad 3000 enters the pop-up state where the pedal pad 3000 protrudes from the pedal housing 1000.

As illustrated in FIG. 12, when the pedal pad 3000 enters the pop-up state where the pedal pad 3000 protrudes from the pedal housing 1000, the driver pushes down on the operation surface 3100 of the protruding pedal pad 3000 with his/her foot and performs a normal operation.

Figure 13:
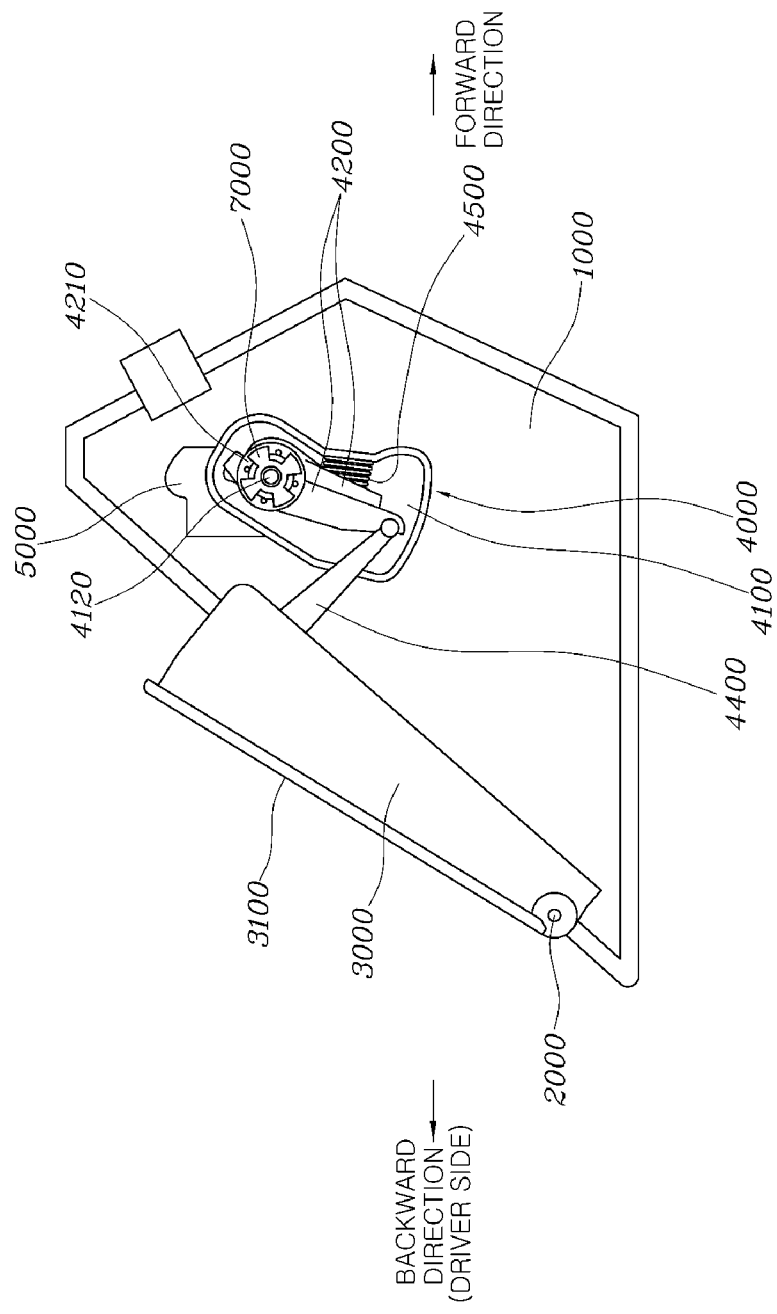
FIG. 13 is a view illustrating a state where the pedal pad in FIG. 12 rotates by a driver' operation and operates normally.

FIG. 13 illustrates a state where the driver depresses the pedal pad 3000 that pops up in a manner that protrudes from the pedal housing 1000.

When the driver depresses the pedal pad 3000 that pops up in a manner that protrudes from the pedal housing 1000, the pedal pad 3000 rotates forward about the hinge pin 2000 and the rotational force of the pedal pad 3000 is transferred to the rotation lever 4200 through the connection link 4400. Thus, the rotation lever 4200 rotates about the center shaft 4120. At this time, the return spring 4500 is compressed.

In addition, when the rotation of the pedal pad 3000 by a driver's operation rotates the rotation lever 4200, the permanent magnet 7000 combined with the hinge 4210 of the rotation lever 4200 rotates together with the rotation lever 420 and this rotation changes a position of the permanent magnet 7000. At this time, the non-contact pedal sensor 8000 detects the rotation angle of the pedal pad 3000 through a change in magnetic field strength that depends on a change in rotation position of the permanent magnet 700 and generates the signal associated with acceleration.

Figure 14:
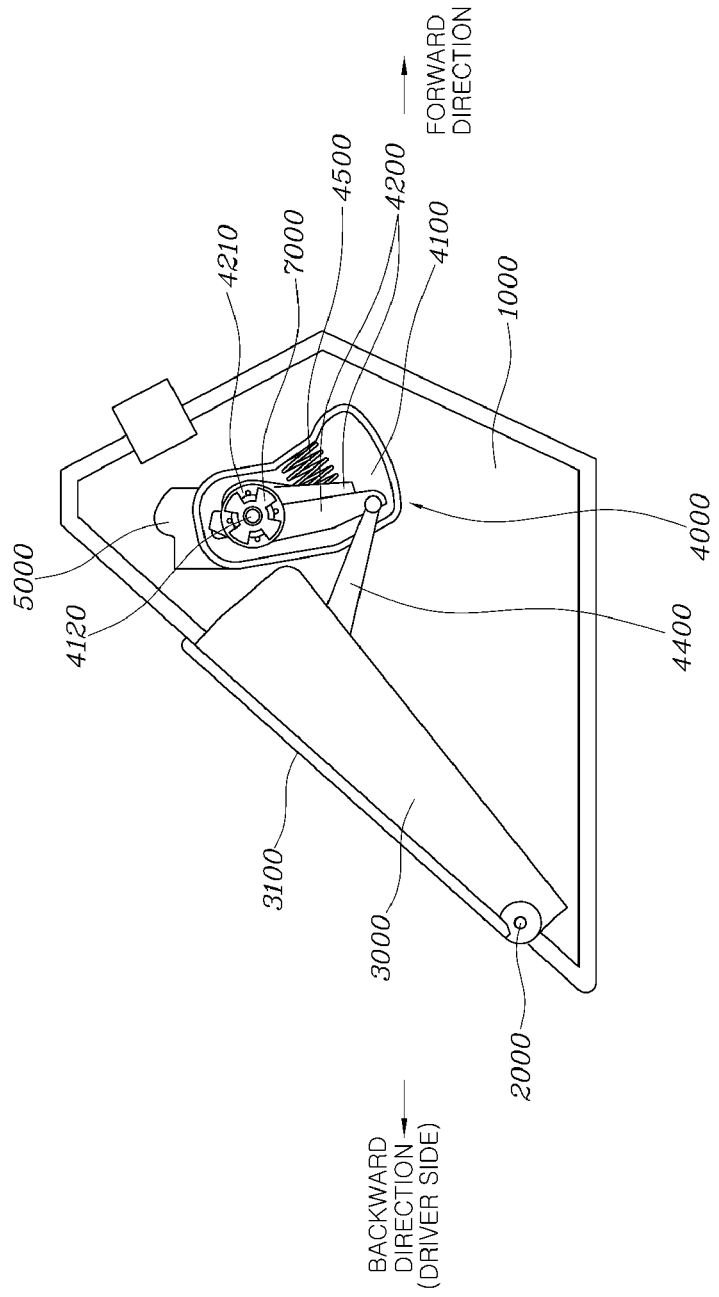
FIG. 14 is a view illustrating a hidden state where the pedal pad in FIG. 12 is concealed in the pedal housing.

FIG. 14 illustrates that by operation of the linear motor 5000, the pedal pad 3000 rotates forward and retracts into the pedal housing 1000 to enter the hidden state where the pedal pad 3000 is concealed and is accordingly prevented from being exposed to the outside.

When the rotary motor 5000, positioned to a lateral side of the hysteresis module 4000, operates, the rotation of the motor rod 5100 rotates the hysteresis module 4000 (counterclockwise), and the rotation of the hysteresis module 4000 in turn causes the pedal pad 3000 connected through the connection link 4400 to rotate forward about the hinge pin 2000. Thus, the pedal pad 3000 retracts into the pedal housing 1000 to enter the hidden state where the pedal pad 3000 is concealed.

When as illustrated in FIG. 14, the hidden state where the pedal pad 3000 is concealed is entered, the space below the driver's seat becomes a wide space in which there is no interference of to the pedal. Thus, the driver can rest comfortably in the relaxation mode. Furthermore, the pedal can be prevented from improper functioning in an autonomous traveling situation, thereby improving the safety of the driver.

According to an embodiment of the present disclosure, the rotation of the motor rod 5100 by operation of the rotary motor 5000 rotates the hysteresis module 4000 and the rotation of the hysteresis module 4000 in turn changes the position of the permanent magnet 7000. At this time, the non-contact pedal sensor 8000 does not generate the signal associated with acceleration in order to prevent improper functioning of the pedal.

That is, by operation of the rotary motor 5000, the pedal pad 3000 changes to the pop-up state as illustrated in FIG. 12 or the hidden state as illustrated in FIG. 14. At this time, although the position of the permanent magnet 7000 changes, the non-contact pedal sensor 8000 does not generate the signal associated with acceleration. Thus, an accident due to the improper functioning of the pedal can be prevented.

However, as illustrated in FIG. 13, in the state where the pedal pad 3000 pops up and in a situation where the rotary motor 5000 does not operate, by the driver's operation, the pedal pad 3000 rotates, and thus the rotation lever 4200 rotates and the rotation of the rotation lever 4200 changes the position of the permanent magnet 7000. Only at this time, the non-contact pedal sensor 8000 generates the signal associated with acceleration. Thus, a stable operation is ensured.

To that end, a sensor that detects a position of the motor rod 5100 is provided in the rotary motor 5000. The non-contact pedal sensor 8000 determines whether or not the signal associated with acceleration is generated, using positional information of the motor rod 5100, which is detected through the sensor.

As described above, in the foldable accelerator pedal apparatus according to the present disclosure, in a manual driving mode situation where the driver drives with human input, in order for the driver to be able to operate the pedal pads 300 and 3000, the pedal pads 300 and 3000 protrude from the pedal housing 100 and 1000, respectively, and pop up in a manner that is exposed toward the driver. Furthermore, in an autonomous traveling mode situation where the driver drives the vehicle without any human input, in order for the driver not to be able to operate the pedal pads 300 and 3000, the pedal pads 300 and 3000 enter the hidden state where the pedal pads 300 and 3000 are concealed in the pedal housings 100 and 1000, respectively and are prevented from being exposed toward the driver. In the autonomous traveling mode situation, this configuration provides the advantage that the driver can rest comfortably and that the pedal can be prevented from improper functioning, thereby ensuring the safety of the driver.

The specific embodiments of the present disclosure are illustrated and described, and it will be obvious to a person of ordinary skill in the art that various modifications and alterations are possibly made to the present disclosure without departing from the technical idea of the present disclosure that is claimed in the following claims.

What is claimed is:

1. A foldable accelerator pedal apparatus equipped with a hysteresis module for a vehicle, the apparatus comprising:
    a pedal housing fixedly installed in a space below a driver's seat;
    a pedal pad rotatably combined with the pedal housing by a hinge pin and configured to be operated by a driver's foot;
    the hysteresis module installed in the pedal housing in a linearly movable manner and connected to the pedal pad, the hysteresis module generating hysteresis when a driver operates the pedal pad; and
    a linear motor that includes a motor rod fixedly installed in the pedal housing and connected to the hysteresis module and that generates motive power for reciprocating the motor rod,
    wherein through the linear movement of the hysteresis module by the reciprocation of the motor rod, the pedal pad switches between a hidden state where the pedal pad is concealed in the pedal housing and a pop-up state where the pedal pad is exposed.

2. The apparatus according to claim 1, further comprising:
    a printed circuit board fixedly installed in the pedal housing and electrically connected to the linear motor, the printed circuit board configured to control operation of the linear motor.

3. The apparatus according to claim 1, wherein the pedal pad is an organ-shaped pad having a lower end portion combined with the pedal housing by a hinge pin and an upper end portion rotating backward and forward about the hinge pin, and
    an upper portion of the hinge pin is combined with the hysteresis module.

4. The apparatus according to claim 1, wherein the pedal housing has a guide slot extending vertically, and
    the hysteresis module has a guide protrusion that is inserted into the guide slot and moves upward and downward along the guide slot.

5. The apparatus according to claim 4, wherein the hysteresis module comprises:
    a lever housing having the guide protrusion, the lever housing being combined with the motor rod;
    a rotation lever having a first end portion having a hinge portion rotatably combined with a center shaft provided in the lever housing;
    a friction bush that is combined with the center shaft, and when the rotation lever rotates, generates a frictional force due to contact with the rotation lever;
    a connection link that rotatably connects a second end portion of the rotation lever and the pedal pad with each other; and
    a return spring of which opposed end portions are supported on the lever housing and the rotation lever, respectively.

6. The apparatus according to claim 5, further comprising:
    a permanent magnet combined with the hinge portion of the rotation lever; and
    a non-contact pedal sensor fixedly installed in the pedal housing in a manner that faces the permanent magnet, wherein the non-contact pedal sensor detects a rotation angle of the pedal pad through a change in magnetic field strength that depends on a change in position of the permanent magnet, which takes place when the rotation lever rotates, and generates a signal associated with acceleration.

7. The apparatus according to claim 6, wherein when by the reciprocation of the motor rod by operation of the linear motor, the hysteresis module moves and the movement of the hysteresis module changes the position of the permanent magnet, the non-contact pedal sensor does not generate the signal associated with acceleration in order to prevent improper functioning of the accelerator pedal.

8. The apparatus according to claim 6, wherein in the pop-up state and in a situation where the linear motor does not operate, only when rotation of the pedal pad by a driver's operation changes the position of the permanent magnet, the non-contact pedal sensor generates the signal associated with acceleration.

9. The apparatus according to claim 4, wherein the linear motor is fixedly installed in the pedal housing in a manner that is positioned above the hysteresis module, and
    wherein when by operation of the linear motor, the motor rod moves backward into the linear motor and the hysteresis module moves to be positioned at an uppermost end of the guide slot, the pedal pad rotates about the hinge pin and protrudes from the pedal housing to enter the pop-up state where the pedal pad is exposed.

10. The apparatus according to claim 4, wherein the linear motor is fixedly installed in the pedal housing in a manner that is positioned above the hysteresis module, and
    wherein when by operation of the linear motor, the motor rod moves forward in a manner that protrudes from the linear motor and the hysteresis module moves to be positioned at a lowermost end of the guide slot, the pedal pad rotates about the hinge pin and retracts into the pedal housing to enter the hidden state where the pedal pad is concealed.

11. A foldable accelerator pedal apparatus equipped with a hysteresis module for a vehicle, the apparatus comprising:
    a pedal housing fixedly installed in a space below a driver's seat;
    a pedal pad rotatably combined with the pedal housing by a hinge pin and configured to be operated by a driver's foot;
    a rotary motor fixedly installed in the pedal housing and equipped with a motor rod that rotates; and
    the hysteresis module that is combined with the motor rod and thus rotates together with the motor rod, that is connected to the pedal pad, and that generates hysteresis when a driver operates the pedal pad,
    wherein through rotation of the hysteresis module by the rotary motor, the pedal pad switches between a hidden state where the pedal pad is concealed in the pedal housing and a pop-up state where the pedal pad is exposed.

12. The apparatus according to claim 11, wherein the pedal pad is an organ-shaped pad having a lower end portion combined with the pedal housing by a hinge pin and an upper end portion rotating backward and forward about the hinge pin, and an upper portion of the hinge pin is combined with the hysteresis module.

13. The apparatus according to claim 11, wherein the hysteresis module comprises:
    a lever housing combined with the motor rod;
    a rotation lever having a first end portion having a hinge portion rotatably combined with a center shaft provided in the lever housing;

a friction bush that is combined with the center shaft, and when the rotation lever rotates, generates a frictional force due to contact with the rotation lever;

a connection link that rotatably connects a second end portion of the rotation lever and the pedal pad with each other; and a return spring of which opposed end portions are supported on the lever housing and the rotation lever, respectively.

14. The apparatus according to claim 13, further comprising:

a permanent magnet combined with the hinge portion of the rotation lever; and a non-contact pedal sensor fixedly installed in the pedal housing in a manner that faces the permanent magnet, wherein the non-contact pedal sensor detects a rotation angle of the pedal pad through a change in magnetic field strength that depends on a change in position of the permanent magnet, which takes place when the rotation lever rotates, and generates a signal associated with acceleration.

15. The apparatus according to claim 11, wherein the rotary motor is fixedly installed in the pedal housing in a manner that is positioned to a lateral side of the hysteresis module, and wherein according to a rotation direction of the motor rod, which depends on operation of the rotary motor, the pedal pad rotates about the hinge pin and protrudes from the pedal housing to enter the pop-up state where the pedal pad is exposed or retracts into the pedal housing to enter the hidden state where the pedal pad is concealed.

16. The apparatus according to claim 11, wherein when the rotation of the hysteresis module by operation of the rotary motor changes a position of a permanent magnet, a non-contact pedal sensor does not generate a signal associated with acceleration in order to prevent improper functioning of the accelerator pedal.

17. The apparatus according to claim 11, wherein in the pop-up state and in a situation where the rotary motor does not operate, only when rotation of the pedal pad by a driver's operation changes a position of a permanent magnet, a non-contact pedal sensor generates a signal associated with acceleration.

* * * * *